(12) United States Patent
Ferigo et al.

(10) Patent No.: US 9,987,886 B2
(45) Date of Patent: Jun. 5, 2018

(54) TIRE

(71) Applicants: COMPAGNIE GENERALE DES ETABLISSEMENTS MICHELIN, Clermont-Ferrand (FR); MICHELIN RECHERCHE ET TECHNIQUE S.A., Grenges-Paccot (CH)

(72) Inventors: Hervé Ferigo, Clermont-Ferrand (FR); Hélène Emorine, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 260 days.

(21) Appl. No.: 14/901,407

(22) PCT Filed: Jun. 26, 2014

(86) PCT No.: PCT/EP2014/063497
§ 371 (c)(1),
(2) Date: Dec. 28, 2015

(87) PCT Pub. No.: WO2014/207093
PCT Pub. Date: Dec. 31, 2014

(65) Prior Publication Data
US 2016/0152097 A1  Jun. 2, 2016

(30) Foreign Application Priority Data

Jun. 28, 2013 (FR) ..................................... 13 56249

(51) Int. Cl.
*B60C 11/00* (2006.01)
*B60C 11/01* (2006.01)
(Continued)

(52) U.S. Cl.
CPC ................ *B60C 13/02* (2013.01); *B60C 9/02* (2013.01); *B60C 9/18* (2013.01); *B60C 11/01* (2013.01);
(Continued)

(58) Field of Classification Search
CPC ......... B60C 11/00; B60C 11/01; B60C 13/00; B60C 13/02; B60C 13/023
See application file for complete search history.

(56) References Cited

U.S. PATENT DOCUMENTS 2,354,715 A    8/1944  Tarbox
4,723,585 A *  2/1988  Mechtel ................. B60C 11/11
                                                152/209.16
(Continued)

FOREIGN PATENT DOCUMENTS

CN    101772430     7/2010
EP    2 181 865     5/2010
(Continued)

OTHER PUBLICATIONS

Office Action (and an English translation) dated Sep. 21, 2016 which issued in the corresponding Chinese Patent Application No. 201480035764.2.

*Primary Examiner* — Justin R Fischer
(74) *Attorney, Agent, or Firm* — Cozen O'Connor

(57) ABSTRACT

A tire comprising a carcass reinforcement (2) surmounted radially on the outside by a crown reinforcement (3), itself radially on the inside of a tread (4) having two axially outermost ends. The crown reinforcement (3) has a layer of reinforcing elements. The tread is connected to two beads (5) by two sidewalls (6), each bead (5) comprising at least one circumferential reinforcing element. Sidewalls (6) comprise, on their exterior surface, a series of protuberances (8) alternating with voids (9). The tread (4) comprises, at least at one axially outermost end (4a), a circumferential groove (Continued)

(10), wherein each protuberance (8) is positioned at the surface of a sidewall, the different protuberances being arranged regularly or irregularly and continuously between a point A and a point E, and wherein at least one protuberance (8) partially or completely interrupts or does not interrupt the circumferential groove (10).

19 Claims, 5 Drawing Sheets

(51) Int. Cl.
   *B60C 13/00*   (2006.01)
   *B60C 13/02*   (2006.01)
   *B60C 9/02*    (2006.01)
   *B60C 9/18*    (2006.01)
   *B60C 11/03*   (2006.01)
   *B60C 15/02*   (2006.01)

(52) U.S. Cl.
   CPC .............. *B60C 11/03* (2013.01); *B60C 15/02* (2013.01); *B60C 2011/0341* (2013.01)

(56) References Cited

U.S. PATENT DOCUMENTS

| 6,189,586 | B1 | 2/2001 | Guidry |
| 6,533,007 | B1 | 3/2003 | McMannis |
| 6,802,350 | B2 * | 10/2004 | Ohura ..................... B60C 9/20 152/454 |
| 6,843,291 | B1 * | 1/2005 | Gaudin .................... B60C 3/06 152/209.14 |
| 2009/0107600 | A1 | 4/2009 | Missik-Gaffney |
| 2010/0038001 | A1 * | 2/2010 | Yamaguchi ......... B60C 11/0309 152/153 |
| 2015/0114538 | A1 | 4/2015 | Tsuruta et al. |

FOREIGN PATENT DOCUMENTS

| FR | 888453 | 11/1942 |
| JP | 62-4611 | 1/1987 |
| JP | 2003 237317 | 8/2003 |
| JP | 2008 068716 | 3/2008 |
| JP | 4202169 | * 12/2008 |
| WO | WO 03/020538 | 3/2003 |
| WO | WO 2009/029088 | 3/2009 |
| WO | WO 2011/162748 | 12/2011 |

* cited by examiner

Section on A-A

TIRE

RELATED APPLICATIONS

This is a U.S. National Phase Application under 35 USC 371 of International Application PCT/EP2014/063497 filed on Jun. 26, 2014.

This application claims the priority of French application no. 1356249 filed Jun. 28, 2013, the entire content of which is hereby incorporated by reference.

FIELD OF THE INVENTION

The invention relates to cross-ply or radial tires.

BACKGROUND OF THE INVENTION

Radial tires are gradually being imposed on various markets, notably the market for passenger vehicle tires. This success is due in particular to the endurance, comfort and low rolling resistance qualities that radial tires have to offer.

The main parts of a tire are the tread, the sidewalls and the beads. The beads are intended to come into contact with the rim. In a radial tire, each of the main parts of which the tire is made, namely the tread, the sidewalls and the beads, has functions that are clearly separated from one another, and therefore has a well known specific makeup.

A radial tire is essentially reinforced by a carcass reinforcement comprising at least one carcass ply set at an angle substantially equal to 90° with respect to the circumferential direction of the tire. This carcass reinforcement is surmounted radially on the outside, and under the tread, by reinforcing plies that form a belt.

A cross-ply tire differs from a radial tire in that there are at least two crossed plies set at angles other than 90° with respect to the circumferential direction of the tire. The plies are said to be "crossed" because the angles are of opposite sign from one ply to the other.

It will be recalled that, according to the invention, the circumferential direction of the tire is the direction in a plane perpendicular to the axis of rotation of the tire and tangential to the tire belt reinforcement.

After the emergence of radial tires, certain cross-ply tires were also provided with a belt reinforcement under the tread.

In both these types of tire, the tread, in direct contact with the ground, notably has the function of providing contact with the roadway and needs to adapt to the shape of the ground. The sidewalls themselves absorb the unevennesses of the ground by transmitting the mechanical forces required to support the load of the vehicle and allow it to move.

The belt reinforcement is a reinforcement which, on the one hand, needs to be sufficiently rigid with regard to edge deformations so that the tire can develop the cornering thrust necessary for steering, and transmit torque for traction or for braking and, on the other hand, be very soft in bending, which means to say allow variations in curvature in its plane in order to provide a sufficient area of contact of the tire with the ground.

As a result, the belt reinforcement generally has a composite structure allowing it to offer the required rigidity for a relatively low weight. The belt reinforcement is generally made up of at least two plies set at different angles, comprising reinforcers in the form of cords, coated with rubber. The reinforcer elements are crossed from one ply to the other with respect to the circumferential direction and may or may not be symmetric with respect to this direction.

DEFINITIONS

"longitudinal or circumferential direction" is the direction of running of the tire, "radial direction" is a direction that intersects the axis of rotation of the tire and is perpendicular thereto, "axial direction" is a direction parallel to the axis of rotation of the tire, "radially on the inside of" means closer to the axis of rotation, "radially on the outside of" means further away from the axis of rotation, "equatorial plane or midplane" means a plane perpendicular to the axis of rotation of the tire and which divides the tire into two substantially equal halves, "transverse direction of the tire" means a direction parallel to the axis of rotation, "radial or meridian plane" means a plane containing the axis of rotation of the tire.

Tires comprising sidewalls with external reinforcers which are intended to reduce the internal temperature at points on the tire that may deteriorate with use are already known from document JP2008068716 A.

However, the arrangement of these reinforcers on the sidewalls does not allow the sidewalls of a tire to be reinforced correctly for lateral knocks, such as kerbing (knocks against a kerb) or in potholes.

Indeed such knocks, which occur at various speeds and/or at various angles of attack, with conventional tire designs may cause damage, sometimes even going so far as to cause the tire to be scrapped.

Furthermore, the current trend towards the use of aluminium, rather than steel, rims in order notably to contribute to the overall aesthetic appearance of the vehicle has the consequence of causing the constituent parts of the carcass to break upwards of markedly lower speeds when the tire suffers lateral knocks.

Moreover, the current desire to use tires with increasingly short sidewall heights has, as yet another consequence, the fact that a knock to such sidewalls causes more intense degradation than it does with sidewalls that are taller, thus being more damaging to the tire.

A tire comprising discontinuous portions of elastomer rubber that have different rigidities and that are arranged on the sidewalls in such a way as to reduce the noise inherent to the operation thereof is also known, from document JP2003 237317.

Patent FR888 453 moreover describes tire casings the two sides of which comprise projections made of elastomer rubber which are intended to verify that the pressure of the tire is consistent with the load because of the geometric shape that they have.

Finally, document U.S. Pat. No. 2,354,715 discloses the presence of protrusions of elastomer rubber comprising metallic elements and arranged on the ends of the tread of a tire and which are intended to prevent it from slipping during running

SUMMARY OF THE INVENTION

One object of the invention to improve still further the robustness of tire sidewalls with respect to lateral knocks, without thereby changing the current dimensions thereof.

One aspect of the invention is directed to a tire for a rolling assembly comprising a rim and a tire, the said tire comprising at least one carcass reinforcement surmounted radially on the outside by a crown reinforcement, itself radially on the inside of a tread having two axially outermost ends, the said crown reinforcement being made up of at least one layer of reinforcing elements, the said tread being connected to two beads by two sidewalls, the said beads being intended to come into contact with a rim having rim flange tops, each bead comprising at least one circumferential reinforcing element, the said sidewalls comprising, on their exterior surface, a series of protuberances alternating with voids, the said tread comprising, at least at one axially outermost end, a circumferential groove.

The tire is characterized in that each protuberance is positioned at the surface of a sidewall, the different protuberances being arranged regularly or irregularly and continuously between a point A and a point E, the said point A being arranged at the intersection of the radially exterior surface of the tread and of the sidewall, with a radial axis ZZ' distant from the equatorial plane AA' by a length $L_A$ of between ½ (L-85 mm) and ½ (L-10 mm), L being the external section width, and the said point E being arranged, according to choice, at a radius in the range:

$R_2 < E < (0.75 R_1 + 0.25 R_2)$, $R_2$ being the radius at the top of the rim flange and $R_1$ being the radius at the external section width—(interval I), or in the range $0.95 R_1 < E < (0.75 R_A + 0.25 R_1)$, $R_1$ being the radius at the external section width and $R_A$ being the radius at the point A (interval II), and in that at least one protuberance partially or completely interrupts or does not interrupt the said circumferential groove.

The terms "does not interrupt" mean that the radially upper end of a protuberance is either adjacent to the circumferential groove or distant by a distance "d" substantially arranged in a radial direction and of between 2 and 10 mm The terms "partially interrupts" means that the radially upper end of a protuberance partially intersects the circumferential groove.

The terms "completely interrupts" mean that the radially upper end of a protuberance meets the axially outer end of the tread that is closest to it.

When the protuberance partially interrupts the groove, this interruption takes place over between 2 and 97% of the total axial separation of the said groove, preferably between 20 and 80% and more preferably between 30 and 50%.

The groove is a region of given width situated around the point A and having a longitudinal void ratio of greater than 70%.

The term "regular" defines the fact that the protuberances arranged between the points A-B and C-D are arranged in alignment with one another in a radial direction, possibly with symmetry, and uniformly.

The term "irregular" means that the protuberances arranged between the points A-B and C-D are arranged with offset in two radial and parallel directions without symmetry and nonuniformly.

The radius $R_A$ is a function of the length $L_A$, itself a function of the length L.

$R_1$ may lie in the interval between $(0.8 R_2 + 0.2 R_A)$ and $(0.2 R_2 + 0.8 R_A)$.

The external section width L is defined as being the width of the air chamber of a tire mounted on a rim and inflated; the external section width being, according to the invention, the distance between the outside of the sidewalls of an inflated tire, incorporating the sidewall surface relief. $R_1$ corresponds to the radius at the point situated on the exterior surface of the sidewall furthest away from the midplane.

The tire according to an embodiment of the invention has the advantage of being quick and easy to produce and of being able to withstand particularly violent lateral knocks without creating substantial damage that could possibly carry appreciable risk to the passengers of the vehicle.

The tire according to an embodiment of the invention also has the advantage of offering overall performance, such as rolling resistance, wear, endurance, that is similar to that of tires that have no protuberances on the sidewall.

Another aspect of the invention is a mounted assembly comprising a rim and the tire as described hereinabove.

For preference, at least one protuberance has a height and a length, the said height being optimal at the centre of the said length of the said protuberance. For preference, the height of a protuberance is minimal at the external section width.

For preference, at least two protuberances have different lengths from one another.

For preference, each protuberance has a mean height of between 3 and 10 mm.

For preference, each protuberance has a mean width of between 4 and 12 mm.

The mean height of each protuberance may be between 5 and 8 mm The protuberances may have a mean height greater than 80% of the maximum height over at least 80% of the distance between the points A and E. The mean height is defined as being the mean of the height comprised between the ends of a protuberance.

The protuberances preferably have a relief angle α less than or equal to 20° and preferably of between 5 and 8°.

Two adjacent protuberances may be spaced apart by a mean distance less than or equal to twice the mean width of a protuberance, and may be substantially parallel to one another.

The protuberances preferably cover at least 40% of the total circumferential surface area of the sidewall between the points A and E.

Each protuberance, of defined or arbitrary geometric shape, may have a neutral fibre passing through a radially innermost end and through a radially outermost end and set at an angle β, with respect to the radial direction ZZ', of between −60° and +60°.

The outboard sidewall of the tire (which is the one on the outside when mounted on the vehicle) and the inboard sidewall of the tire (which is the one on the inside when mounted on the vehicle) may each comprise protuberances with any possible combination of inclinations.

Likewise, the four tires of a vehicle may have inclinations that can vary according to each axle and/or that can vary on one and the same axle.

For preference, the void between two adjacent protuberances extends axially in the continuation of the void of a circumferential groove of the tread, passing through the point A, the said groove being arranged on at least one axial end of the tread.

For preference, the void between two adjacent protuberances is set at an angle, to the circumferential direction, of between −15° and +15° in a region of the sidewall close to the point A, namely situated between 3 and 8 mm.

For preference, in a defined radial plane and whatever this plane situated between the points A and E, the sum of the widths, which may be variable, of each protuberance in the circumferential direction is greater than or equal to 60% of the total circumferential length, the said length being measured at the location of the protuberances.

The tire according to an embodiment of the invention may have a [sum of the total widths of each protuberance]/2 πR ratio greater than or equal to 30% and more preferably equal to 60%, the widths of each protuberance being defined at 50% of the total height of the said protuberance, this being valid for any tire radius R lying in the interval $R_E<R<R_a$ where $R_a$ is the radius at the point A and RE is the radius at the point E.

The protuberance may be present over the entire circumferential length of the sidewall of the tire.

The protuberances present on the sidewalls according to an embodiment of the invention are made of a material that is the same as that of the sidewalls.

BRIEF DESCRIPTION OF THE DRAWING

The invention will now be described with the aid of the following examples of drawings that are given purely by way of illustration and in which.

In the various figures, technical elements that are identical or similar bear the same references. In order not to overburden the text, their descriptions are not repeated.

DETAILED DESCRIPTION OF THE DRAWINGS

Figure 1:
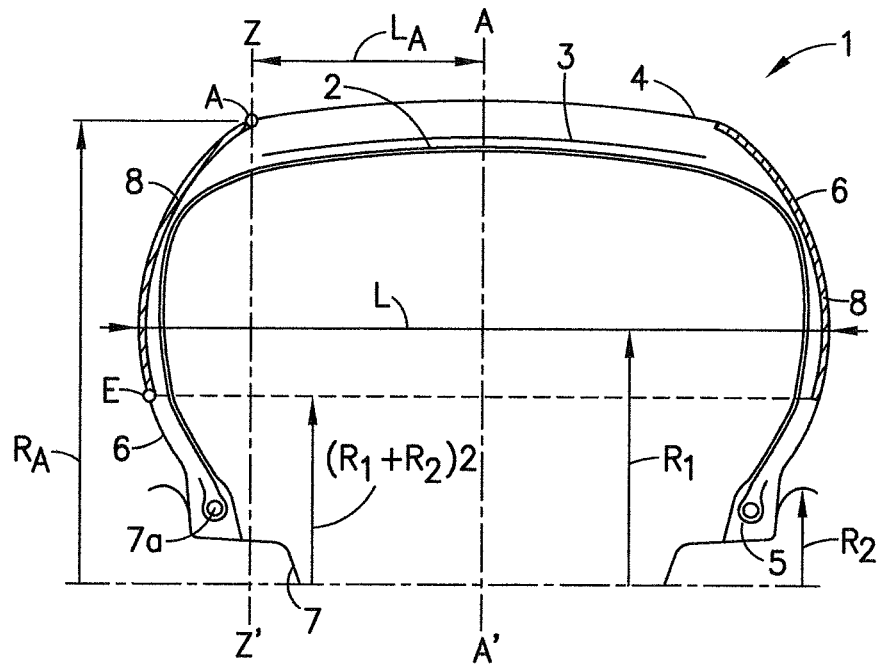
FIG. 1 schematically depicts a cross section on a radial plane through a tire according to the invention.

As FIG. 1 shows, the passenger-vehicle tire of general reference 1 comprises a carcass reinforcement 2 radially on the inside of a belt reinforcement of overall reference 3, the said belt reinforcement 3 being radially on the inside of a tread 4 itself connected to two beads 5 by two sidewalls 6. The beads 5 are intended to come into contact with a rim 7 (partially depicted). Each bead comprises at least one circumferential reinforcing element 7a. On their surface, the sidewalls comprise a series of protuberances 8 regularly alternating with voids 9 (shown in FIG. 2).

FIG. 1 shows a protuberance 8 in cross section, this protuberance having a continuous neutral fibre. It will be recalled here that a neutral fibre is the name given to a neutral axis that passes substantially through the centre of the volume of each protuberance and which neither shortens nor lengthens when subjected to compression and/or depression.

As FIG. 1 shows, the protuberances 8 are arranged, at the surface of the sidewall, over a continuous length of neutral fibre extending from a point A to a point E.

The point E is arranged at a radius less than $(0.75\ R_1+0.25\ R_2)$. $R_1$ is the radius at the external section width L, and $R_A$ is the radius at the point A.

The point E is arranged at a radius of 232 mm for a tire of reference 205/55 R 16 mounted on a 6.5 J 16 rim for which $R_A$ is equal to 298 mm, $R_2$ is equal to 220 mm and $R_1$ is equal to 261 mm.

The definition of external section width according to the invention is suitable for any type of casing combined with any type of rim.

The point A is arranged at the intersection between the radially exterior surface of the tread and of the sidewall, with an axis at 22' distant from the equatorial plane AA' by a length $L_A$ equal to ½ (L-45 mm) For a tire of reference 205/55 R 16, $R_A$ is equal to 298 mm.

The protuberances are not inserted rubber elements added into the rubber of the sidewalls but are moulded in during the curing stage. They are obtained in a similar way to the tread patterns produced on the tread.

Figure 2A:
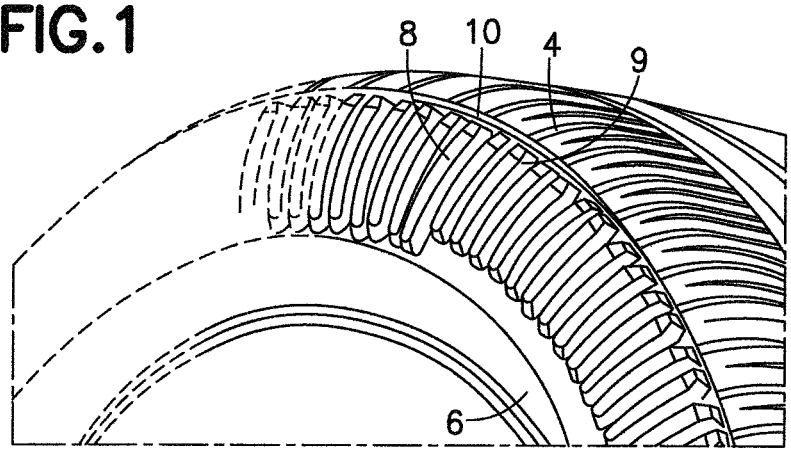
FIGS. 2A and 2B are three-dimensional schematic depictions of a portion of a sidewall and of the corresponding tread of a tire according to the invention.
Figure 2B:
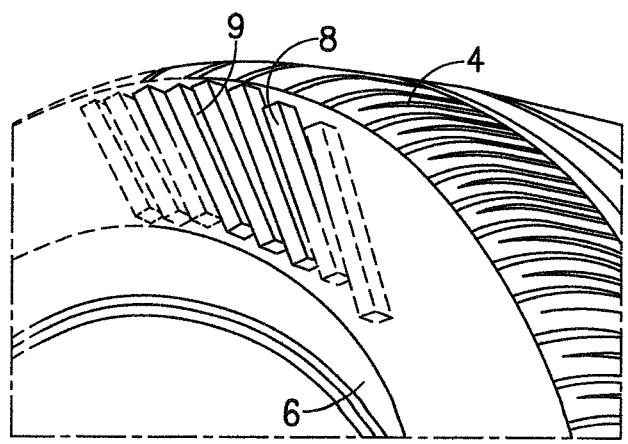
Figure 3:
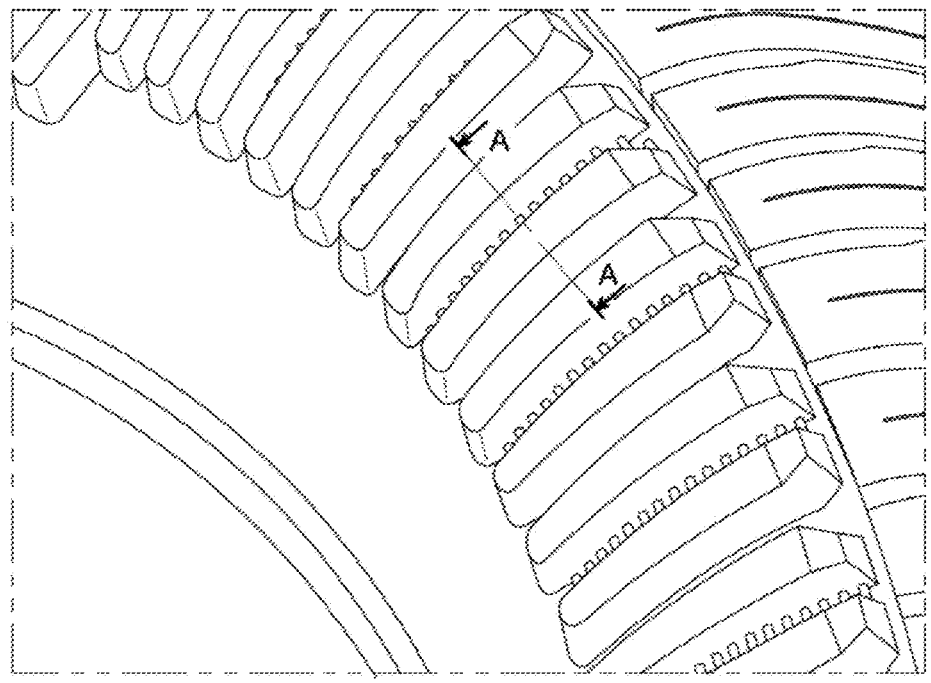
FIG. 3 is an enlarged schematic depiction of a sidewall comprising protuberances of a tire according to the invention.
Figure 4:
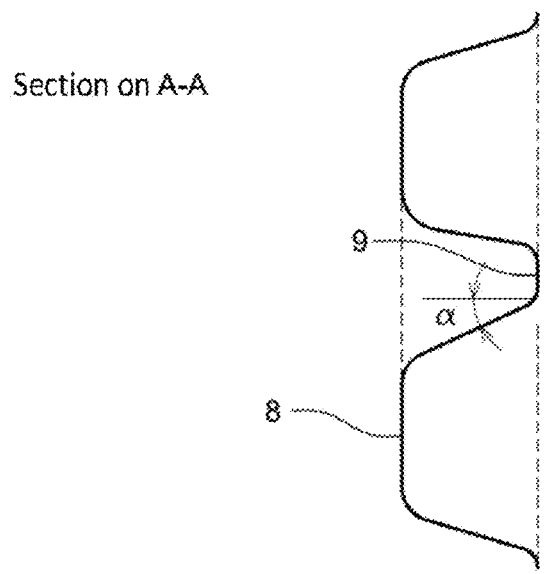
FIG. 4 is a view in section on AA of FIG. 3 showing two adjacent protuberances of a tire according to the invention.

FIG. 2A depicts an alternation of protuberances 8 and of voids 9, represented in enlarged form in FIGS. 3 and 4. FIG. 2B depicts an alternative form of FIG. 2A in which the protuberances are set at an angle with respect to the axial direction. In this embodiment, the longest continuous protuberances 8 have a neutral-fibre length of around 75 mm for a tire of size 205/55 R 16. They are arranged radially (FIG. 2) substantially parallel to one another and are spaced apart by approximately 4.50 mm, have a height of approximately 6 mm and a width of approximately 8.6 mm in their axially innermost part.

The relief angle α is approximately 8°. Such a value of relief angle allows the tire to be demoulded after curing without damage to the final structure.

According to this embodiment, the protuberances have a [sum of the widths of each protuberance]/2 πR ratio equal to 30%, at mid-height and are set at no angle with respect to the radial plane.

Figure 5A:
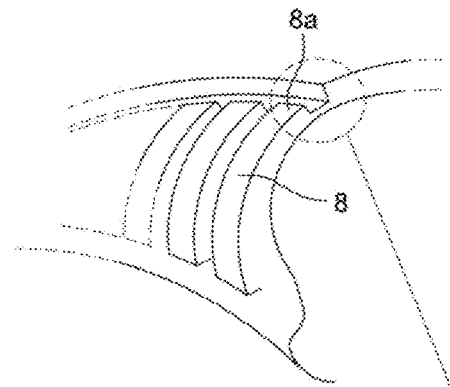
FIGS. 5A and 5B depict, according to a first alternative form, a portion of a radially exterior part of a sidewall and the corresponding tread in three dimensions of a tire according to the invention.
Figure 5B:
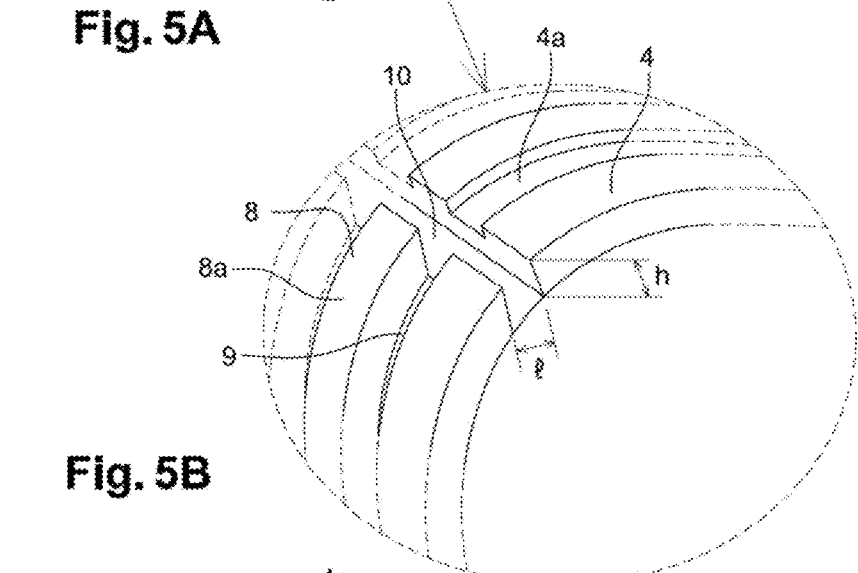

FIG. 5A is a three-dimensional depiction of the radially exterior part 8a of the protuberances 8 and FIG. 5B an enlargement thereof from FIG. 5A. In these FIGS. 5A and 5B, the part 8a of each protuberance 8 and the voids 9 are adjacent to a groove 10 arranged circumferentially on the surface of the tread 4 at the axially outermost end 4a thereof. The groove 10 is not interrupted in its length.

In this particular embodiment, the groove 10 has an axial width (1) along the axis YY' that may be between 2 and 10 mm and a radial height "h" along the axis ZZ' of between 3 and 8 mm.

Figure 6A:
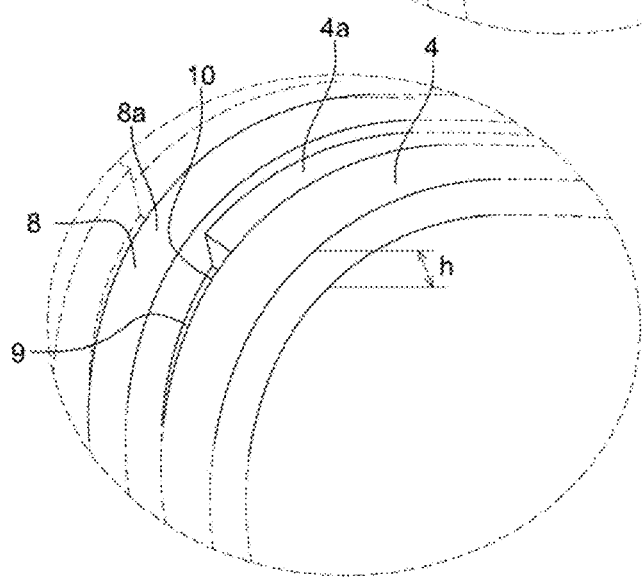
FIG. 6A depicts, according to a second alternative form, a portion of a radially exterior part of a sidewall and of the corresponding tread in three dimensions, of which a certain protuberance completely interrupts a circumferential groove of a tire according to the invention.

FIG. 6A also shows a three-dimensional depiction of the radially exterior part 8a of the protuberances 8. Unlike in FIGS. 5A and 5B, the groove 10 is interrupted. Specifically, the end 8a of the protuberances 8 and the adjacent voids 9 completely intersect the groove 10 in the circumferential direction of the tire.

Figure 6B:
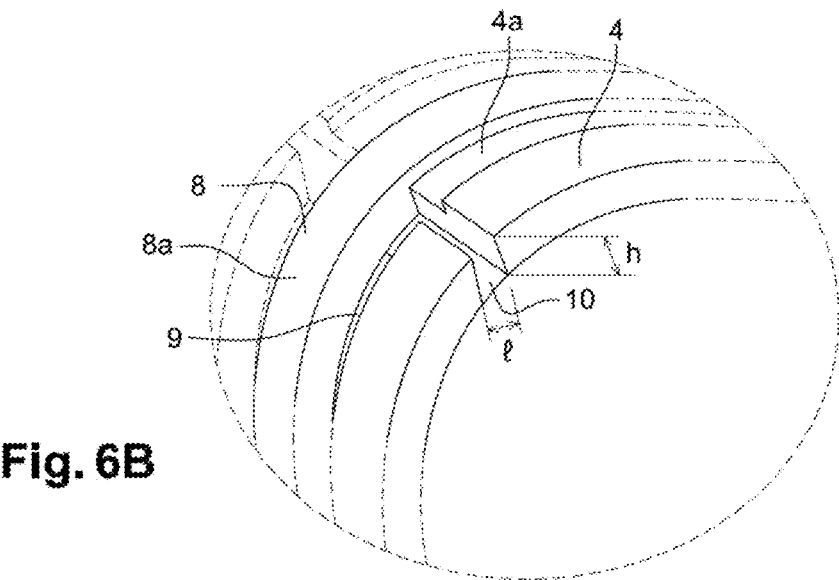
FIG. 6B depicts, according to another alternative form, a portion of a radially exterior part of a sidewall and of the corresponding tread in three dimensions of which a certain protuberance partially interrupts a circumferential groove of a tire according to the invention.

FIG. 6B shows another alternative form of a three-dimensional depiction of the said radially exterior part 8a of the protuberances 8. In this figure, the protuberance 8 partially intersects the groove 10 in the circumferential direction of the tire.

Figure 7A:
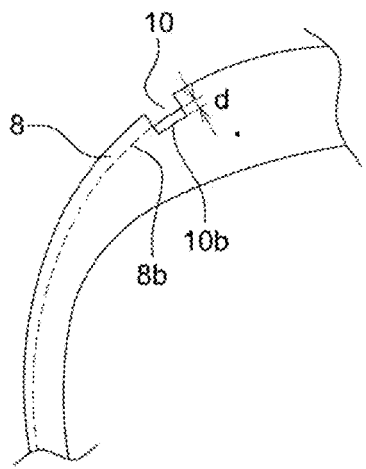
FIG. 7A depicts a partial view in radial section of a part of a sidewall and of a corresponding part of the tread according to another alternative form.
Figure 7B:
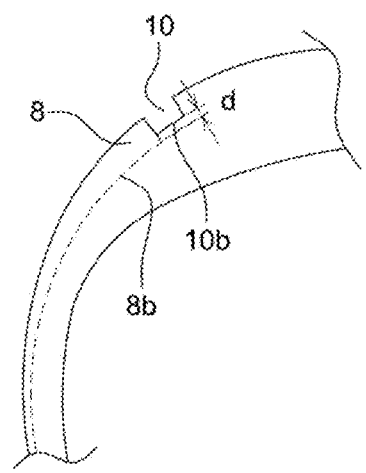
FIG. 7B depicts a partial view in radial section of a part of a sidewall and of a corresponding part of the tread according to another alternative form of a tire according to the invention.

FIGS. 7A and 7B show that the radially interior portion 8b (depicted in dotted line) of the protuberance 8 is distant by a thickness "d" from the radially interior part 10b of the void 10. This thickness "d" is less than 2 mm and preferably less than 1 mm.

Figure 8:
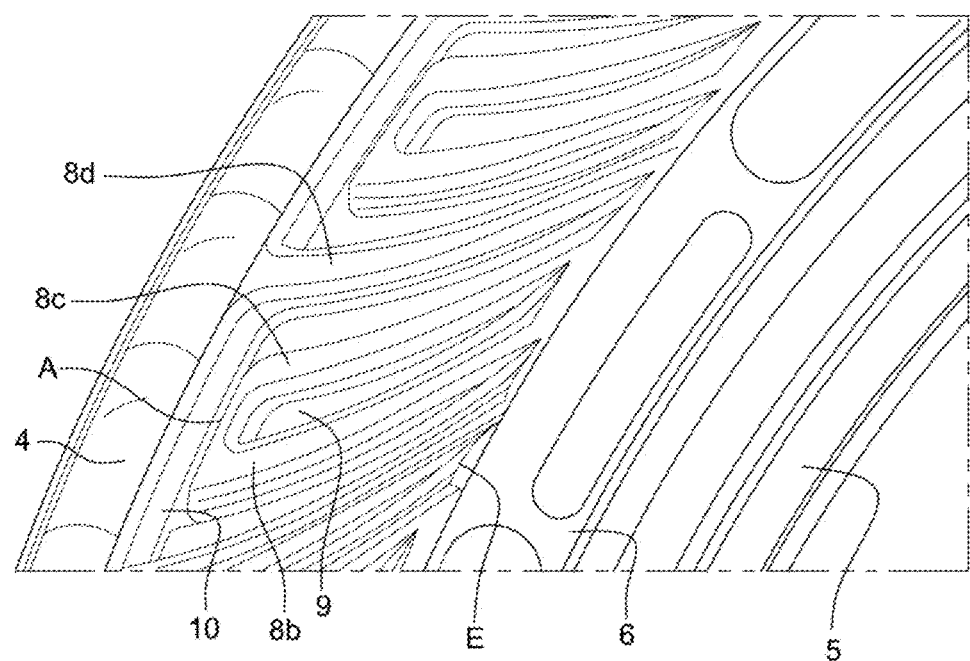
FIG. 8 is a schematic three-dimensional depiction of a portion of a sidewall and of the corresponding bead of a tire according to the invention.

FIG. 8 shows that the radially upper end of the protuberances 8b and 8c is adjacent to the circumferential groove 10 and that the radially upper end of the protuberance 8d completely interrupts the groove 10 to reach the blocks of elastomeric rubber of the tread 4. This figure thus shows an embodiment of a tire according to the invention in which each protuberance 8b, 8c alternates with a void 9. Each of the protuberances 8b, 8c extend from the point A to the point E.

The tire according to the invention is obtained after curing and moulding in a curing mould in the conventional way.

EXAMPLE 1

Kerbing Test

This test was carried out with a tire of reference 205/55 R16 comprising various styles of protuberance, against the same control tire without protuberances.

The tires P1 to P4 are various tires according to the invention.

The protuberances of tires P1 and P4 are set at no angle of inclination with respect to the radial direction.

The protuberances of tires P2 and P3 are set at an angle of inclination with respect to the radial direction.

The "angle" column corresponds to the angle made by each protuberance with the radial direction of the tire.

The relief angle α is the angle made by each end of a protuberance, as depicted in FIG. 4, intended to make same easier to demould.

The spacing of a protuberance is the distance between the centre of a first void and the centre of a second void adjacent to the first.

H (mm) is the mean height of the protuberances, 1 (mm) is the mean width of the protuberances.

$R_1$ is the radius at the external section width, $R_2$ is the radius at the top of the rim flange, $R_E$ is the radius corresponding to the point E and $R_A$ the radius at the point A.

The external section height with reliefs comprises the external section width and the height of the protuberances present on the surface of the sidewalls.

Table I below collates the measurable technical features of the various tires according to the invention.

TABLE I

| Tire | Control | P1 | P2 | P3 | P4 |
|---|---|---|---|---|---|
| Angle (degrees) | None | 0 | +60 | −60 | 0 |
| Protuberance relief angle (degrees) | — | 8 | 8 | 6 | 6 |
| Protuberance height H (mm) | — | 8 | 8 | 6 | 5 |
| Protuberance width l (mm) | — | 10 | 10 | 5 | 7 |
| Protuberance neutral fibre length (mm) | — | 53 | 75 | 75 | 55 |
| $R_1$ (mm) | 260 | 261 | 261 | 261 | 261 |
| $R_2$ (mm) | 220 | 220 | 220 | 220 | 220 |
| $R_E$ (mm) | — | 224.1 | 224.1 | 224.1 | 228 |
| $R_A$ (mm) | — | 298 | 298 | 298 | 298 |

TABLE I-continued

| Tire | Control | P1 | P2 | P3 | P4 |
|---|---|---|---|---|---|
| External section width with reliefs (mm) | 212 | 223 | 223 | 220 | 223 |
| Spacing (mm) | 0 | 15 | 15 | 7 | 14 |

This test was carried out under the following operating conditions.

The tire, mounted on a 6.5 J 16 rim and inflated to a pressure of 1.9 bar is fitted to the front right axle of a vehicle and supports a load of 350 kg.

The test consists in carrying out a knock against a kerb referred to as a "kerbing" of the tire against a metal block 90 mm tall, at an angle of 30° to the block with respect to the direction of running of the tire and at various speeds.

This test is carried out with a control tire (that has no protuberances) and with various tires according to the invention that comprise protuberances that may or may not make an angle with the radial axis of the tire.

The results in table II below show the gain obtained in terms of speed, between a control tire (result equal to 100) and the various tires according to the invention, mentioned hereinabove, before the tire punctures.

TABLE II

| Tire | Gain in speed (%) |
|---|---|
| Control | 100 |
| P1 | 120 |
| P2 | 125 |
| P3 | 135 |
| P4 | 120 |

The results in table II clearly show that the tire according to the invention, whatever the embodiment, provides a marked improvement in the speed with which the kerb can be hit before the tire punctures.

EXAMPLE 2

Kerbing Test

This test was carried out with a tire of reference 245/40 R18 comprising various styles of protuberance, against the same control tire without protuberances.

The tires P1 to P4 are various tires according to the invention.

The various technical features mentioned in respect of example 1 are reproduced in example 2.

Table III below collates the measurable technical features of the various tires according to an alternative form of the invention.

TABLE III

| Tire | Control | P1 | P2 |
|---|---|---|---|
| Angle (degrees) | None | 0 | +30 |
| Protuberance relief angle (degrees) | — | 8 | 8 |
| Protuberance height H (mm) | — | 6 | 6 |
| Protuberance width l (mm) | — | 6 | 6 |
| Protuberance neutral fibre length (mm) | — | 45 | 52 |
| $R_1$ (mm) | 277 | 277 | 277 |
| $R_2$ (mm) | 248 | 248 | 248 |
| $R_E$ (mm) | — | 272 | 272 |

TABLE III-continued

| Tire | Control | P1 | P2 |
|---|---|---|---|
| $R_A$ (mm) | — | 313 | 313 |
| External section width with reliefs (mm) | 249 | 249 | 249 |
| Spacing (mm) | 0 | 12 | 12 |

This test was carried out under the same operating conditions as those explained in respect of example 1 with an 8.5 J 18 rim and a tire inflated to a pressure 2.3 bar, all mounted on the front right axle of a vehicle and supporting a load of 580 kg.

The results in table IV below show the gain obtained in terms of speed, between a control tire (result equal to 100) and the various tires according to the invention, mentioned hereinabove, before the tire punctures.

TABLE IV

| Tire | Gain in speed (%) |
|---|---|
| Control | 100 |
| P1 | 128 |
| P2 | 130 |

The results in table IV clearly show that the tire according to the invention, whatever the embodiment, provides a marked improvement in the speed with which the kerb can be hit before the tire punctures.

The invention claimed is:

1. A tire for a rolling assembly comprising a rim and a tire, said tire comprising at least one carcass reinforcement surmounted radially on the outside by a crown reinforcement, itself radially on the inside of a tread having two axially outermost ends, said crown reinforcement being made up of at least one layer of reinforcing elements, said tread being connected to two beads by two sidewalls, said beads being intended to come into contact with a rim having rim flange tops, each bead comprising at least one circumferential reinforcing element, said sidewalls comprising, on their exterior surface, a series of protuberances alternating with voids, said tread comprising, at least at one axially outermost end, a circumferential groove, wherein each said protuberance is positioned at the surface of the sidewall, said protuberances being arranged regularly or irregularly and extending continuously only between a point A and a point E, said point A being arranged at the intersection of the radially exterior surface of the tread and of the sidewall, at a radial axis distant from the equatorial plane of the tire by a length $L_A$ of between ½(L-60 mm) and ½(L-10 mm), where L is the external section width (in mm) of the tire, and said point E being arranged at a radius in the range:

$$R_2 < E < (0.75R_1 + 0.25R_2)$$

where $R_2$ is the radius at the top of the rim flange, and $R_1$ is the radius at the external section width, or said point E being arranged at a radius in the range:

$$0.95R_1 < E < (0.75R_A + 0.25R_1)$$

where $R_1$ is the radius at the external section width, and $R_A$ is the radius at the point A, and wherein at least one protuberance does not interrupt said circumferential groove, and at least one protuberance completely interrupts said circumferential groove.

2. A tire for a rolling assembly comprising a rim and a tire, said tire comprising at least one carcass reinforcement surmounted radially on the outside by a crown reinforcement, itself radially on the inside of a tread having two axially outermost ends, said crown reinforcement being made up of at least one layer of reinforcing elements, said tread being connected to two beads by two sidewalls, said beads being intended to come into contact with a rim having rim flange tops, each bead comprising at least one circumferential reinforcing element, said sidewalls comprising, on their exterior surface, a series of protuberances alternating with voids, said tread comprising, at least at one axially outermost end, a circumferential groove, wherein each said protuberance is positioned at the surface of the sidewall, said protuberances being arranged regularly or irregularly and extending continuously only between a point A and a point E, said point A being arranged at the intersection of the radially exterior surface of the tread and of the sidewall, at a radial axis distant from the equatorial plane of the tire by a length $L_A$ of between ½(L-60 mm) and ½(L-10 mm), where L is the external section width (in mm) of the tire, and said point E being arranged at a radius in the range:

$$R_2 < E < (0.75R_1 + 0.25R_2)$$

where $R_2$ is the radius at the top of the rim flange, and $R_1$ is the radius at the external section width, or said point E being arranged at a radius in the range:

$$0.95R_1 < E < (0.75R_A + 0.25R_1)$$

where $R_1$ is the radius at the external section width, and $R_A$ is the radius at the point A, and wherein at least two said protuberances have different lengths from one another.

3. The tire of claim 2, wherein at least one said protuberance has a height and a length, said height being optimal at the centre of said length of said protuberance.

4. The tire of claim 2, wherein each said protuberance has a mean height of between 3 and 10 mm.

5. The tire of claim 2, wherein each said protuberance has a mean width of between 4 and 12 mm.

6. The tire of claim 2, wherein the mean height of each said protuberance is between 5 and 8 mm.

7. The tire of claim 2, wherein each said protuberance has a mean height greater than 80% of the maximum height over at least 80% of the distance between the points A and E.

8. The tire of claim 2, wherein each said protuberance has a relief angle α less than or equal to 20°.

9. The tire of claim 2, wherein two adjacent said protuberances are spaced apart by a mean distance less than or equal to twice the mean width of a protuberance.

10. The tire of claim 2, wherein two adjacent said protuberances are substantially parallel to one another.

11. The tire of claim 2, wherein the protuberances cover at least 40% of the total circumferential surface area of the sidewall between the points A and E.

12. The tire of claim 2, wherein each said protuberance, of defined or arbitrary geometric shape, has a neutral fibre passing through a radially innermost end and through a radially outermost end and set at an angle β, with respect to the radial direction, of between −60° and +60°.

13. The tire of claim 2, wherein the void between two adjacent protuberances extends into the circumferential groove of the tread, passing through the point A, said groove being arranged on at least one axial end of the tread.

14. The tire of claim 2, wherein two adjacent said protuberances form between them a void which is set at an angle, with respect to the radial direction, of between −15° and +15° in a region of the sidewall close to the point A.

15. The tire of claim 2, having a [sum of the total widths of each protuberance]/2πR ratio greater than or equal to 30%, the widths of each said protuberance being defined at 50% of the total height of said protuberance and the tire radius R lying in the interval $R_E<R<R_a$ where $R_a$ is the radius at the point A, and $R_E$ is the radius at the point E.

16. The tire of claim 2, wherein each said protuberance has a relief angle α between 5 and 8°.

17. The tire of claim 2, having a [sum of the total widths of each protuberance]/2πR ratio greater than or equal to 60% and less than or equal to 70%, the widths of each said protuberance being defined at 50% of the total height of said protuberance and the tire radius R lying in the interval $R_E<R<R_a$, where $R_a$ is the radius at the point A, and $R_E$ is the radius at the point E.

18. A tire for a rolling assembly comprising a rim and a tire, said tire comprising at least one carcass reinforcement surmounted radially on the outside by a crown reinforcement, itself radially on the inside of a tread having two axially outermost ends, said crown reinforcement being made up of at least one layer of reinforcing elements, said tread being connected to two beads by two sidewalls, said beads being intended to come into contact with a rim having rim flange tops, each bead comprising at least one circumferential reinforcing element, said sidewalls comprising, on their exterior surface, a series of protuberances alternating with voids, said tread comprising, at least at one axially outermost end, a circumferential groove, wherein each said protuberance is positioned at the surface of the sidewall, said protuberances being arranged regularly or irregularly and extending continuously only between a point A and a point E, said point A being arranged at the intersection of the radially exterior surface of the tread and of the sidewall, at a radial axis distant from the equatorial plane of the tire by a length $L_A$ of between ½(L-60 mm) and ½(L-10 mm), where L is the external section width (in mm) of the tire, and said point E being arranged at a radius in the range:

$$R_2<E<(0.75R_1+0.25R_2)$$

where $R_2$ is the radius at the top of the rim flange, and $R_1$ is the radius at the external section width, or said point E being arranged at a radius in the range:

$$0.95R_1<E<(0.75R_A+0.25R_1)$$

where $R_1$ is the radius at the external section width, and $R_A$ is the radius at the point A, and wherein the sum of the width of the protuberances, in the circumferential direction, is greater than or equal to 60% of the total circumferential length.

19. A mounted assembly comprising a rim and a tire of claim 2 mounted on the rim.

\* \* \* \* \*